US011232675B2

(12) United States Patent
Harris

(10) Patent No.: US 11,232,675 B2
(45) **Date of Patent: *Jan. 25, 2022**

(54) PROMOTIONAL GAMING EVENTS AND AWARDS

(71) Applicant: Ronnie W. Harris, Las Vegas, NV (US)

(72) Inventor: Ronnie W. Harris, Las Vegas, NV (US)

( * ) Notice: Subject to any disclaimer, the term of this patent is extended or adjusted under 35 U.S.C. 154(b) by 29 days.

This patent is subject to a terminal disclaimer.

(21) Appl. No.: 16/599,292

(22) Filed: Oct. 11, 2019

(65) Prior Publication Data

US 2020/0090464 A1 Mar. 19, 2020

Related U.S. Application Data

(63) Continuation of application No. 15/483,687, filed on Apr. 10, 2017, now Pat. No. 10,445,979, which is a continuation of application No. 14/820,801, filed on Aug. 7, 2015, now Pat. No. 9,619,966, which is a continuation of application No. 14/154,937, filed on Jan. 14, 2014, now Pat. No. 9,105,155, which is a continuation of application No. 13/360,237, filed on Jan. 27, 2012, now abandoned.

(60) Provisional application No. 61/437,516, filed on Jan. 28, 2011.

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |

(52) U.S. Cl.
CPC ........ *G07F 17/3244* (2013.01); *G07F 17/329* (2013.01); *G07F 17/3211* (2013.01); *G07F 17/3248* (2013.01); *G07F 17/3255* (2013.01)

(58) Field of Classification Search
USPC ............................ 463/10, 16, 17, 20, 25, 39
See application file for complete search history.

(56) References Cited

U.S. PATENT DOCUMENTS

| | | | |
|---|---|---|---|
| 5,941,772 | A | 8/1999 | Paige |
| 5,991,736 | A | 11/1999 | Ferguson et al. |
| 6,183,362 | B1 | 2/2001 | Boushy |
| 6,234,897 | B1 | 5/2001 | Frohm et al. |
| 6,311,976 | B1 | 11/2001 | Yoseloff et al. |
| 6,379,247 | B1 | 4/2002 | Walker et al. |
| 6,435,511 | B1 | 8/2002 | Vancura et al. |
| 6,523,824 | B1 | 2/2003 | Colapinto et al. |
| 6,540,609 | B1 | 4/2003 | Paige |
| 7,455,586 | B2 | 11/2008 | Nguyen et al. |
| 7,789,744 | B2 | 9/2010 | Fiden |
| 7,824,258 | B2 | 11/2010 | Walker et al. |
| 7,874,900 | B2 | 1/2011 | Ward et al. |

(Continued)

FOREIGN PATENT DOCUMENTS

| | | |
|---|---|---|
| WO | 00/32286 | 6/2000 |

*Primary Examiner* — Adetokunbo O Torimiro
(74) *Attorney, Agent, or Firm* — Weide & Miller, Ltd.

(57) ABSTRACT

Wagering games include promotional events and promotional awards, such as the award of free or reduced cost goods and services. Promotional awards may be reward by the receipt of property logo symbols during game play. Promotional awards rewarded at one casino may be redeemable only at a second casino. Promotional awards may be rewarded based upon game play metrics of identified or anonymous players.

19 Claims, 1 Drawing Sheet

(56) References Cited

U.S. PATENT DOCUMENTS

| | | | |
|---|---|---|---|
| 7,997,972 | B2 | 8/2011 | Nguyen et al. |
| 8,002,639 | B2 | 8/2011 | Mayr et al. |
| 8,065,212 | B2 | 11/2011 | Amour |
| 8,550,901 | B2 | 10/2013 | Walker et al. |
| 2003/0032474 | A1 | 2/2003 | Kaminkow |
| 2003/0141660 | A1 | 7/2003 | Colapinto et al. |
| 2004/0142742 | A1 | 7/2004 | Schneider et al. |
| 2007/0077981 | A1 | 4/2007 | Hungate et al. |
| 2008/0009344 | A1 | 1/2008 | Graham et al. |
| 2008/0167106 | A1 | 7/2008 | Lutnick et al. |
| 2008/0179831 | A1 | 7/2008 | Hollander |

PROMOTIONAL GAMING EVENTS AND AWARDS

RELATED APPLICATION DATA

This application is a continuation of U.S. patent application Ser. No. 15/483,687, filed Apr. 10, 2017, which is a continuation of U.S. patent application Ser. No. 14/820,801, filed Aug. 7, 2015, now U.S. Pat. No. 9,619,966, which is a continuation of U.S. patent application Ser. No. 14/154,937, filed Jan. 14, 2014, now U.S. Pat. No. 9,105,155, which is a continuation of U.S. patent application Ser. No. 13/360,237, filed Jan. 27, 2012, now abandoned, and claims priority to U.S. Provisional Application Ser. No. 61/437,516, filed Jan. 28, 2011, which prior applications are incorporated by reference herein as if set forth in their entirety.

FIELD OF THE INVENTION

The present invention relates to games, and particularly to games which yield promotional awards and games having promotional events.

BACKGROUND OF THE INVENTION

Wager based gaming such as poker, roulette, slots and bingo are old and well-known. In recent years, many variations to these games have been developed in order to make the games more interesting and exciting for players.

Most casinos now offer a multitude of different games. For example, a casino might have hundreds or thousands of gaming machines. Many of those gaming machines may be configured to present video slot games. While the basic form of these games is the same, they may have various specific themes or include specific features to distinguish them from other games and make them interesting to as many players as possible.

However, a need still exists to make gaming more exciting to players. For example, many casinos have a player loyalty club by which the casino monitors the play of their club patrons. This allows the casino to award rewards to club patrons for high levels of gaming. For example, a patron who wagers high amounts in a month might be awarded club points which the patron may redeem for a mug, a jacket or the like.

These player tracking systems, however, have various drawbacks. One drawback is that players who do not wish to become members of the club may not have the ability to receive any club awards. In addition, such clubs generally only award players for high levels of game play and require the patrons to travel to a club booth in order to receive their awards. These types of awards are thus very limiting, and may exclude players that do not visit casinos frequently.

SUMMARY OF THE INVENTION

One or more embodiments of the invention comprise promotional gaming awards and promotional events. In one embodiment, play of one or more wagering games results in a promotional award, such as the award of free or reduced cost goods or services.

As one aspect of the invention, a casino, hotel or resort property identifies itself by one or more logos, such as in advertising, building signage or the like. The appearance of one or more of those logos as symbols in a wagering game or a bonus event preferably results in a promotional award to a player. Preferably, the promotional award relates to that casino, hotel or resort property, such as a free night's stay, a free meal at a restaurant at the casino or the like.

In accordance with another aspect of the invention, promotional awards yielded at a first casino or property relate to or are usable or redeemable only at a second casino or property. Preferably, the second casino or property is located remote from the first casino or property. The promotional awards entice players to travel to the second casino or property at one or more times to utilize or exercise their promotional awards. For instance, an award of complementary hotel accommodations at the second property would be utilized to so entice players.

In accordance with another aspect of the invention, promotional awards yielded for gaming play, such as play of one or more gaming machines, are provided by third party non-gaming vendors. Third party vendors, such as the makers of consumer goods or services, preferably supply promotional awards. Such an award might comprise, for example, a beer provided by a particular brewer. The promotional award might be rewarded when a player receives a symbol bearing the vendors' logo during the play of a game or bonus/promotional event.

In accordance with yet another embodiment of the invention, bingo game promotional awards are yielded in the form of winning promotional bingo card outcomes. Certain card permutations or outcomes may yield specific promotional awards. In other instances, certain card permutations or outcomes may be winning and provide the player the opportunity to play one or more "promotional" bingo cards. The promotional cards may comprise a sub-set of a larger card permutation where the sub-set has modified winning probabilities and where winning combinations for those cards yield various promotional awards, as described above.

In accordance with another embodiment of the invention, an animated character may be associated with the play of one or more games at electronic gaming machines. Such a character may provide game tips or yield awards, such as promotional awards, to the player.

In one embodiment, a promotional award or event might be triggered based upon measured game play. Such an event might comprise a player playing a certain number of games, reaching a level of wagering, reaching a level of winnings, or other measurements of game play. Game play might be tracked with reference to a player who identifies themselves with an identifier, such as a player club card, or anonymously, such as by monitoring game play between designated events which start and end game play tracking.

Promotional events of the invention might comprise aspects of a main game or might comprise one or more secondary events. Preferably, when a promotional event comprises a secondary event that event is presented without the requirement of an additional wager by the player.

The promotional awards may be awarded based upon or be associated with a variety of types of games. In addition, promotional events may be associated with or comprise various types of games. For example, as indicated below, promotional awards and events in accordance with the invention might comprise or be associated with games presented at gaming machines, such as slot-type games, video poker games and bingo games, as well as games presented at gaming tables, such as poker games, roulette games, craps games, blackjack games, bingo and other games.

Further objects, features, and advantages of the present invention over the prior art will become apparent from the detailed description which follows, when considered with the figures provided herein.

DETAILED DESCRIPTION OF THE INVENTION

Figure 2:
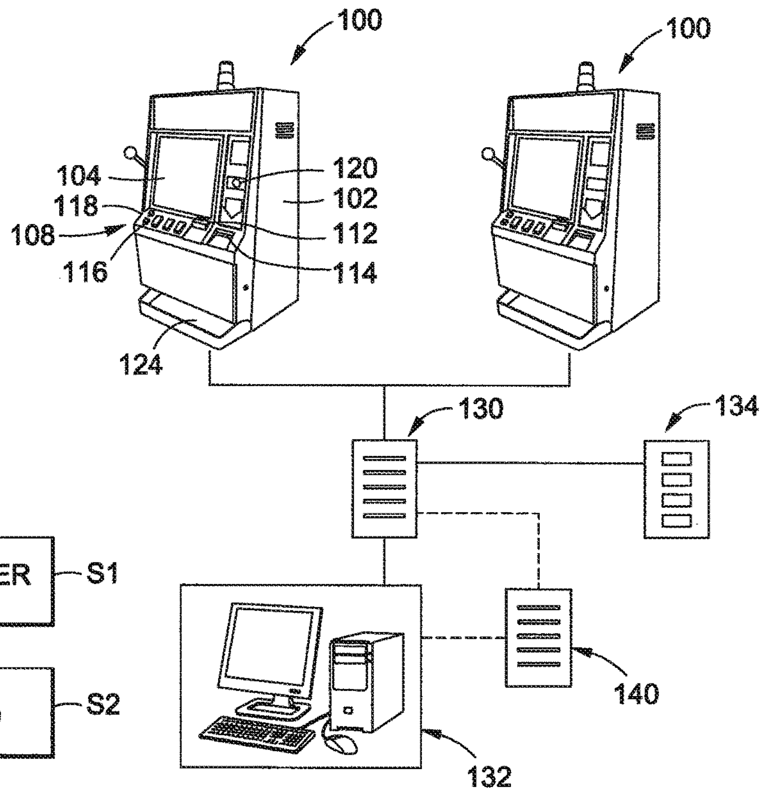
FIG. 2 illustrates gaming machines and a gaming system which may comprise an environment in which an embodiment game of the invention may be implemented.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention comprises promotional gaming awards and events. In one embodiment, play of one or more wagering games result in a promotional award. Preferably, the promotional awards do not comprise monies or monetary credits which are awarded for typical game wins, but instead preferably comprise free or reduced cost goods or services or non-monetary points or the like.

In accordance with one embodiment of the invention, a physical casino or hotel resort property is identified by one or more logos (images, names, symbols, shapes, etc.) displayed at the property. Appearance of one or more of those logos as a symbol in the play of a game yields a promotional award associated with that property.

As one example, a casino property in Las Vegas, Nev. may be identified with a particular logo specific to that property. One or more symbols used or included in the play of a game may comprise this specialty logo. For example, the property logo symbol may directly appear in a game of video slots on one or more of the reels. In one embodiment, a plurality of different game symbols may be used to define different slot game outcomes. One or more property logo symbols might be added to those game symbols. The appearance of one or more property symbols in one or more specific positions of one or more of the reels might trigger a promotional award.

In another embodiment, certain winning game outcomes may trigger a bonus game or secondary event which yields a promotional award. The bonus game or secondary event may comprise the display of one or more symbols including at least one property symbol. For example, as a result of a particular base game outcome a player might enter a promotional bonus event which involves spinning a wheel. The segments of the wheel might include various symbols including at least one property logo symbol. If such a symbol is selected, the player may win a property promotional award.

In a preferred embodiment, the appearance of one or more property symbols, for instance from casino properties with multiple locations, yields promotional awards. As indicated, the appearance of a single property symbol might trigger such an award, while in other embodiment certain combinations of property symbols might be required. In one embodiment, the one or more property symbols may be required to appear in one or more specific locations, such as along an active payline in a slot type game.

The promotional awards preferably comprise non-monetary awards, i.e. do not comprise awards of monies or credits like are awarded for normal game wins. Most preferably, the promotional awards promote the property associated with the symbol/logo. For example, such promotional awards may comprise free or reduced rate rooms, travel accommodations, entertainment, food, merchandise or the like from the property which is associated with the property symbol.

The particular promotional awards associated with the property symbol may vary. For example, certain promotional awards might be awarded based upon the appearance of certain property symbols or combinations thereof. Alternatively, the promotional awards might be selected randomly, might change over time or might otherwise be associated with such symbols.

As one example, a casino property symbol or logo might appear along a payline while a player is playing a video slot game. The appearance of that symbol might automatically result in the award of a free nights stay at one of the casino's properties.

The one or more property symbols might be awarded or appear randomly or based upon certain triggers or the like, including certain combinations of game symbols, levels of player play or the like.

In accordance with this aspect of the invention, goodwill is generated for the casino as a result of the linking of promotional awards to the casino's logos. For example, a casino may utilize one or more names, logos or the like to identify the casino. Those logos might be used in video or print advertising or signage or in a variety of other ways. When a player receives one or more of those logos as part of game play, the player wins a promotional award. This re-enforces the positive image of the casino's logo in the player's mind, and thus creates goodwill for the casino. For example, after receiving a promotional award upon receipt of a property logo symbol during game play, the player upon seeing the casino logo in advertising may be further enticed to the casino for game play upon remembering that the logo was associated with a winning event.

In accordance with another aspect of the invention, promotional awards yielded at a first casino or property relate to or are usable or redeemable only at one or more second casinos or properties. Preferably, the second casino or property is located remote from the first casino or property. Additionally, it would be anticipated that the second casino or property is an independent entity from the first casino property. The event would give the second casino or property the opportunity to engage in joint marketing with the first property. The promotional awards preferably entice players to travel to the second casino or property at one or more times to utilize or exercise their promotional awards.

In this configuration, a promotional award may be awarded at one casino or property. Such a promotional award may be awarded for various reasons, such as a level of game play, a specific game outcome, or entirely separate from game play. The promotional awards may comprise free or reduced rate goods or services which relate to, are provided at, or available at the second casino or property. Such awards might comprise, for example, free or reduced meals at a restaurant located at a second casino or property, free game play at that casino or the like.

As one example, a player might play a bingo game at the Miami Tribe Casino in Miami, Okla. As a result of that player's play, such as because the player reaches a threshold of game play or as a result of a specific bingo game outcome, the player might be awarded travel accommodations and a free night's stay at the MGM Grand Hotel & Casino in Las Vegas, Nev. Such a promotional award may be redeemed by the player by travelling to the MGM Grand to enjoy their free hotel stay, and thus may entice the player to travel to that location.

In accordance with this aspect of the invention, promotional awards yielded at one casino or property beneficially entice patrons or players to travel to other casinos or properties. In this manner, separate casinos or properties may cross-market with one another, creating a marketing synergy which results in greater numbers of patrons frequenting their properties.

In accordance with another aspect of the invention, promotional awards yielded for gaming play, such as play of one or more gaming machines, are provided by third party vendors.

In one embodiment, promotional awards are provided as a result of specific gaming machine outcomes, whether as part of main game wins or as part of secondary or bonus events. The promotional awards preferably do not comprise money or monetary credits, but instead comprise goods or services which are provided by a third party other than the casino or the operator of the games.

As one example, a brewer may provide beer promotional awards or a food product manufacturer may supply food promotional items, etc. In a preferred embodiment, the promotional awards may be yielded by a symbol which bears the trademark/identifier of the vendor, thus providing advertising benefit to the vendor. As one example, a player may play a slot machine at a casino. As a result of the play of a game at that machine, an image of a beer bottle bearing the logo of a particular brewer may be displayed. The gaming machine may then issue a ticket or otherwise indicate the award of a quantity of beer from that brewer. Alternatively, this type of award may be presented to the player upon a losing event, such as when a player has played a final amount of credits on a machine. Rather than simply indicating the player has zero credits left, the game may provide the player with a complementary quantity of beer which does not result in any further cash transaction involving the player but does provide the player with a promotional award. In any instance, the player may redeem that award from the vendor or from the casino via product provided by that brewer. For example, the player might take their ticket for a free beer to a bar within the casino and be provided a beer from that vendor.

In accordance with this aspect of the invention, promotional awards are utilized by a casino to entice players to frequent the casino and participate in casino games. However, the cost of those promotions is born partially or wholly by vendors who supply the promotional awards to the casino, such as in exchange for advertising of their products at the gaming machine(s). In this manner, the cost of implementing the promotion is substantially reduced to the casino.

In accordance with yet another embodiment of the invention, bingo game promotional awards are yielded in the form of winning promotional bingo card outcomes. Certain card permutations or outcomes may yield specific promotional awards. In other instances, certain card permutations or outcomes may be winning and provide the player the opportunity to play one or more "promotional" bingo cards. The promotional cards may comprise a sub-set of a larger card permutation where the sub-set has modified winning probabilities and where winning combinations for those cards yield various promotional awards.

For example, relative to the bingo game described in more detail below, one or more combinations of matches on a bingo card might be designated to be winning outcomes. One or more of those outcomes might comprise regular game winning outcomes having an associated monetary or credit payout. However, one or more of the outcomes might have an associated promotional award instead. Preferably, the promotional awards do not comprise the award of monies or monetary credits, but instead comprise the award of free or reduced priced goods or services such as described above.

As also indicated, in other embodiments, one or more matches or patterns of matches might trigger a promotional event. Such a promotional event might comprise various events such as the play of other bingo cards or other entirely different games, one or more outcomes of which may yield a promotional award. For example, as detailed above, the promotional event might comprise the award of one or more bingo cards from a different set of cards than are used to play the main bingo game. Such cards may have various promotional awards associated with particular matches or patterns of matches. In this manner, the casino can control the odds or probabilities of such promotional awards.

In accordance with another embodiment of the invention, an animated character may be associated with the play of one or more games at electronic gaming machines. Such a character may provide game tips or yield awards, such as promotional awards, to the player.

The animated character may take various forms and may change form. For example, the character might have the appearance of a person, animal, alien or an in-animate object (car, etc). The animated character may comprise a static image, but preferably comprises a moving image.

The animated character may be displayed to a player at various times, such as randomly or in response to various triggering events. For example, the animated character might appear and award a promotional award when a player has received a particular game outcome. The animated character might appear and provide a game tip or hint when a certain combination of game symbols appears. For example, after cards are dealt in a video poker game, the animated character might appear and provide a hint as to the best cards to hold and those to replace.

The animated character might be displayed on a video display of a single gaming machine or might be configured to move from one gaming machine to another or to secondary or overhead displays. For example, a promotional event of the invention might be presented at a bank of multiple linked gaming machines. The animated character might appear on the machines and indicate that the next player to receive a particular outcome will receive a promotional award. The animated character may then be displayed on different of the gaming machines, as if hopping from machine to machine, until one of the players wins the promotional award.

The animated character might also be configured to interact with a game, such as to alter a game. As one example, a player might be dealt five cards in a hand of video poker. The animated character might appear and change one of those cards to a wild card before the player holds and replaces cards on the draw, thus improving the probability of a game win. In a game of slots, the animated character might appear and re-spin one of the reels or move one of the reels in or to provide the player with a second chance for a winning outcome in the event an initial spin of the reels was not winning. Of course, such an animated character might interact with games in a wide variety of other fashions. Such interaction may be initiated by specific triggers (such as a level of player gaming play, a certain game outcome) or be initiated randomly.

In one or more embodiments, the player might also be permitted to interact with the animated character. For example, the animated character might comprise a genie.

The player might be permitted to rub a lamp of the genie (such as by touching a touch screen display at the location of the lamp), upon which the player might be provided a gaming tip, a free game spin or other promotional awards or aid.

As indicated herein, the promotional awards or events of the invention may be initiated or triggered in various ways and at various times. In one embodiment, a promotional event or award might be triggered based upon the receipt of a particular property symbol/logo, as detailed above, or might be triggered randomly.

In one embodiment, a promotional award or event might be triggered based upon measured game play. Such might comprise a player playing a certain number of games, reaching a level of wagering, reaching a level of winnings, or other measurements of game play.

Game play metrics might be tracked. In one embodiment, a player might be assigned a player identifier, such as a player tracking card. The player may utilize their player identification to identify themselves when playing games at gaming machines or gaming tables. Game play metrics may be tracked relative to that player and then monitored to determine if they reach triggering levels.

In another embodiment, game play metrics may be tracked anonymously (i.e. without the player being identified or known). For example, game play metrics may be tracked between an initiating event and an ending event. An initiating event might comprise a player providing monies to a gaming machine (such as a ticket representing value or by providing coins or currency to a machine) or a player placing a wager. An ending event might comprise a period of time after the end of one game during which no other games are initiated, the player cashing out, or a player reaching a zero credit balance. Of course, other events might be utilized to start or end game play tracking.

During this anonymous game tracking, game play metrics are again preferably tracked. Upon a player reaching certain triggering metrics, a promotional award or event might be presented to the player.

When a promotional award is yielded to an identified player, the award might be associated with their player account. For example, a player might be awarded a jacket. That award may be indicated to the player during game play. The player may then travel to the casino's patron club booth and use their identifier to identify themselves and collect their promotional award.

An anonymous player might be awarded a promotional award via a ticket or in other manners. For example, if such a player were awarded a jacket, the gaming machine might dispense a ticket which indicates such an award. The player might redeem that ticket at a casino's gift shop or the like.

In one embodiment of the invention, the particular promotional event or award which is yielded may depend upon certain game play metric thresholds. For example, a player might be awarded a free meal for reaching a first threshold of wagered value and a free night's stay for reaching a much higher second threshold of wagered value.

In accordance with a preferred embodiment of the invention, a player may be awarded a promotional award or a promotional event may be initiated when a player loses one or more games or reaches a zero credit balance. For example, a player may be rewarded a promotional award and enticed to continue to play wagering games in the event the player receives a certain number of losing game outcomes, such as five losing game outcomes in succession. In another embodiment, a player might be rewarded a promotional award if the player wagered a certain minimum amount and reached a zero credit balance. In this manner, even if the player played all of their monies, they still comprise a winner by receiving at least one promotional award.

As indicated herein, promotional events might comprise aspects of a main game or might comprise one or more secondary events. Preferably, when a promotional event comprises a secondary event that event is presented without the requirement of an additional wager by the player.

Such a promotional event might comprise various events. One promotional event might comprise a "selection" event, such as where a player is shown one or more treasure chests and the player is permitted to select some, but not all, of those chests. One or more of the chests may have an associated promotional award so that if successfully selected, the player receives a promotional award. The event might alternatively comprise a wheel spin (of a mechanical or video simulated wheel) wherein the stopping position of the wheel determines if the player receives a promotional award and/or the particular promotional award.

Such secondary promotional awards increase the excitement of game play by introducing a separate and different exciting event to the player from the base game.

The promotional awards may be awarded based upon or in association with a variety of types of games. In addition, promotional events may be associated with or comprise various types of games or events. For example, as indicated below, promotional awards and events in accordance with the invention might comprise or be associated with games presented at gaming machines, such as slot-type games, video poker games and bingo games, as well as games presented at gaming tables, such as poker games, roulette games, craps games, blackjack games, bingo and other games.

Preferably, the games which yield promotional awards or the promotional events are wagering events. In such a configuration, a player is required to pay or provide value, such as monies or credits representing monetary value, in order to participate in such events. However, play of such games or events might themselves comprise promotional awards.

Figure 1:
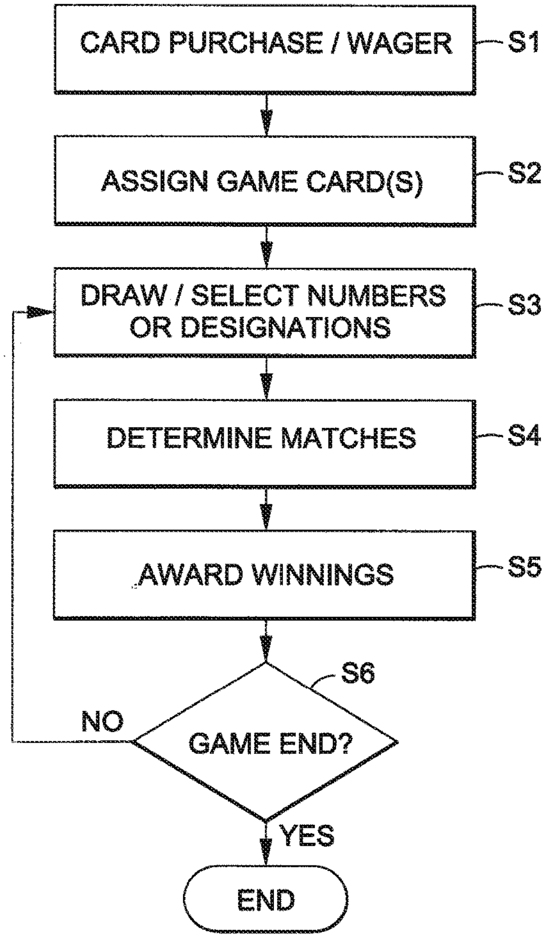
FIG. 1 is a flow diagram of a method of bingo game play in accordance with the invention.

As indicated herein, various promotional awards or events might be associated with a bingo game. FIG. 1 is a flow diagram of a bingo game. In one embodiment in step S1 a player purchases a bingo card or places a wager. As indicated above, such may comprise a player providing a number of credits at a gaming machine. This step might also comprise a player providing monies to an operator. Relative to the game of bingo, a player may be permitted to purchase bingo cards having different values, such as "base" value cards (such as "one credit" cards) or higher value cards, such as "max" value cards (purchased for two or more credits). The particular purchase prices or values of the cards may be determined by the operator.

One or more bingo or game cards are assigned to the player in a step S2. In one embodiment, a player might purchase two or more cards, and such cards may be assigned to the player. The game cards may be provided electronically. For example, relative to the system illustrated in FIG. 2 and detailed below, upon a player placing a wager, a server 130 may assign a game card to a player and transmit game card information to the gaming machine 100 that the player is playing. This game card may be displayed to the player at the gaming machine.

The bingo or other game card may have various configurations. Preferably, the game card bears numbers or other designations. For example, the card might comprise a bingo card having numbers arranged in a 5 by 5 grid (totaling 25 numbers arranged into five rows and five columns). The numbers on the cards might comprise numbers selected from the group of numbers 1-75, which numbers are randomly assigned to the locations of the card. In some embodiments, numbers from the group 1-15 are randomly selected for the 5 spots of the first column, numbers from the group 16-30 are randomly selected for the 5 spots of the second column, etc. for each card. In accordance with one card configuration the numbers 1-75 may be associated with columns designated "B" "I" "N" "G" and "O" and balls or objects may be similarly marked (such as B5; N42, etc.)

In one embodiment, certain criteria may have to be satisfied before a game can be initiated. For example, in a bingo-type game, two or more players may be required before a game can begin. Thus, two or more players may be required to purchase game cards or place wagers before the game begins. Such players may be "local" players, i.e. players who are playing the bingo game at the location where it is offered, or one or more of the players may be remote players who are playing the bingo game via one or more proxy players, as detailed below.

When the game begins, one or more objects which are similarly numbered or designated as the game cards are drawn or selected, as in a step S3. In one embodiment, objects may comprise bingo balls, either in electronic or physical form, which are numbered with the numbers one to seventy-five (1-75). The balls or other objects may be physical objects or may be electronically represented.

In one embodiment, the objects may be selected in one or more sets or "draws". For example, in one embodiment of a game, there is a first single ball draw of thirty (30) numbers or designations which may be represented as balls. In another embodiment, there is a first draw of one (1) number or designation and then a second ball draw of twenty-nine (29) numbers or designations.

In the game of bingo, the numbers or other designations associated with the objects are compared to the numbers or designations on the cards to determine matches and potential wins, as in step S4. It is noted that the process of matching may require input from the player (such as requiring a player to place a "daub" button), and may be required relative to each group or draw of numbers or designations (for example, the player may be required to "daub" after a first single numbers or designation is drawn and then again after the 29 additional numbers or designations are drawn, relative to the example ball draw indicated above). The comparison may be accomplished automatically or manually. For example, a player might select a "daub" button to affect the gaming machine's marking of all matches of drawn or called numbers or designations to those on each of their cards. In other embodiments, such might occur automatically or the player might be required to mark each match.

In one embodiment, one or more predetermined game outcomes are determined to be winning outcomes. In a game of bingo, the winning outcomes may be particular patterns of matches of the numbers or other designations on a card, such as a diagonal, horizontal or vertical line of player numbers, an "X" pattern or the like. The one or more predetermined winning combinations may have prizes associated therewith, as in step S4. One or more winning combinations may be deemed "game ending" patterns in that once received, they cause the game to terminate or bring the game to an end, as in step S5 (the other winning outcomes may be termed "interim" winning outcomes or patterns, since they result in win to the player, but do not end the game). As part of the determination of winning outcomes, associated prizes may be awarded. As indicated herein, such might comprise standard monetary credit awards or alternatively, one or more promotional awards.

Thus, during the course of game play, one or more players may receive interim winning outcomes based upon matches of their card(s) to the one or more initial ball draws. In addition, one or more players might receive the game ending pattern based upon the one or more initial ball draws. As indicated, one or more additional balls may be drawn until a game-ending pattern is received.

In one embodiment of the invention, one or more awards are associated with the designated winning outcomes. Awards for winning outcomes of the game may be defined by a pay table. The pay table may set forth which outcomes of the game are winning and the particular awards for those winning outcomes. When the game is presented via an electronic gaming machine or a gaming system, the pay table may be stored in a memory or data storage device of the gaming machine or a server of the gaming system.

Such a bingo game may be presented in "paper form", such as by a caller calling numbers for matching to numbers printed on physical bingo cards. However, in a preferred embodiment, as indicated above, the bingo game may be presented via or at one or more gaming machines. FIG. 2 illustrates one embodiment of a gaming machine or device 100. As illustrated, the gaming machine 100 may be positioned on a support stand for convenient access by a player, but it may be mounted in a variety of manners. The gaming machine 100 might be located in various environments, such as a casino. Preferably, the gaming machine 100 is a wager-based gaming machine, or machine configured to allow a player to purchase bingo cards or opportunities to play configured to present one or more games to a player which offers the possibility of a prize or winnings.

As indicated above, in preferred embodiments of the invention, the promotional awards are associated with the play of one or more games, such as wagering games presented at one or more gaming machines. In addition, promotional events in accordance with the invention are preferably presented at such gaming machines.

FIG. 2 illustrates one embodiment of such a gaming machine 100. As illustrated, the gaming machine 100 defines a generally enclosed interior space for housing one or more components. As illustrated, the gaming machine 100 generally comprises a housing or cabinet 102 for supporting and/or enclosing various components required for operation of the gaming machine. In the embodiment illustrated, the housing 102 includes a door located at a front thereof, the door capable of being moved between an open position which allows access to the interior, and a closed position in which access to the interior is generally prevented. The configuration of the gaming machine 100 may vary. In the embodiment illustrated, the gaming machine 100 has an "upright" configuration. However, the gaming machine 100 could have other configurations, shapes or dimensions (such as being of a "slant"-type or other configuration as is well known to those of skill in the art).

The gaming machine 100 preferably includes at least one display device 104 configured to display game information. The display device 104 may be a mechanical, electro-mechanical or electronic display, such as one or more rotating reels, a video display or the like. When the display device 104 is an electronic video display, it may comprise a cathode ray tube (CRT), high resolution flat panel liquid crystal display (LCD), projection LCD, plasma display, field emission display, digital micro-mirror display (DMD), digital light processing display (DLP), LCD touchscreen, a light emitting display (LED) or other suitable displays now known or later developed, in a variety of resolutions, sizes and formats (e.g. 4:3, widescreen or the like). The display 104 may be capable of projecting or displaying a wide variety of information, including images, symbols and other indicia or information associated with game play, game promotion or other events.

The gaming machine 100 may be configured to present a wide variety of games. Such games may comprise bingo or bingo-based games, pull-tab games, lotto or instant lottery style games, slot games, poker or other card games or a variety of other games.

In one embodiment, certain game outcomes may be designated as winning outcomes. Prizes or awards may be provided for winning outcomes, such as monetary payments (or representations thereof, such as prize of credits), or promotional awards as detailed herein.

The gaming machine 100 also preferably includes one or more player input devices 108 (such as input buttons, plunger mechanisms, a touch-screen display, joystick, touch-pad or the like) that may be utilized by the player to facilitate game play. Also included in the player input devices 108 is a means for accepting monetary value. As illustrated in FIG. 2, a coin accepting mechanism 112 may be provided for accepting coins and a currency or bill acceptor 114 may be provided for accepting cash or paper currency, or a ticket reader may be provided for accepting and reading tickets or other representations of cash or currency. It is contemplated that other mechanisms may be provided for accepting a payment, such as credit card, ticket readers or input devices whereby a player may have funds paid from a remote account.

In one preferred embodiment, the gaming machine 100 includes a microprocessor or controller (not shown) for controlling the gaming machine, including receiving player input and sending output signals for controlling the various components of the machine 100 (such as generating game information for display by the display 104). The controller may be arranged to receive input such as a purchase/bet signal when a purchase/bet button is depressed, and a currency insert signal when a player inserts bills or coins. The controller may be arranged to send signals for determining winning combinations, for causing the coin hopper/dispenser to pay winnings, and to cause a display to display winning amount information. In addition, the controller is preferably arranged to determine if a round of game play has resulted in a win, and if so, the prize to be awarded to the player for that win.

The controller may be configured to execute machine readable code or "software" or otherwise process information, such as obtained from a remote server. Software or other instructions may be stored on a memory or data storage device. The memory may also store other information, such as pay table information. The gaming machine 100 may also include one or more random number generators for generating random numbers, such as for use in selecting bingo numbers, cards, slot reel symbols or the like, for presenting the game in a random fashion.

In operation, the player may initiate game play by providing value. In the case of a bingo game, this may comprise purchasing one or more bingo cards. In other types of games, this may comprise placing a wager. The purchase or wager is made by activating one of the player input devices 108 such as a one credit button 116 which places a single credit purchase or wager or a max credit button 118 which places a maximum purchase or wager for that round of game play. The maximum purchase or wager is commonly defined as playing or betting an amount comprising a multiple of the value of a single purchase or wager up to a predefined upper purchase or bet limit or threshold. When the player actuates either the one credit button 116 or the max credit button 118, a wager is placed or purchase is made in that amount and the player's credit base is decreased by the number of credits wagered. The player's remaining credit base is typically displayed to the player by way of the display device 104. Upon making a purchase or placing a wager, the game may begin automatically or the player may join a game already in progress, or the player may initiate the game by activating another player input device, upon which the gaming machine 100 presents one or more game elements which are used to determine if the player has received a winning combination.

The gaming machine 100 generally includes a means for awarding a player a prize or winnings accumulated during game play. When a player obtains a winning outcome, the player is preferably paid prizes or awards in the form of stored credits, the amount of which is indicated to the player on the display 104. A "cash out" button may be provided for permitting a player to be paid the winnings or redeeming any credits initially paid into the gaming machine 100. The term "cash out" is used herein to define an event initiated by the player wherein the player receives a number of coins or currency that is equivalent to the value of the player's accrued credit base.

Typically when a player cashes out, the player receives either a paper currency voucher or currency in the form of a cash or coin disbursement. If the player decides to receive a coin disbursement, the gaming machine 100 activates a coin hopper or coin handling device (not shown) which physically counts and delivers the proper number of coins to the player. The coin handling device is commonly configured to transport coins from a supply source (hopper or bin filled with coins) to a coin tray 124 or payout receptacle where the player physically receives the coins. The player might also elect to cash out by having a ticket or other media dispensed, such as via a printer 114.

The gaming machine 100 may be configured as a stand-alone device or be in communication with one or more external devices at one or more times. For example, the gaming machine 100 may be configured as a server based device and obtain game code or game outcome information from a remote server. The gaming machine 100 may also communicate with a remote accounting server and/or player tracking server. As indicated below, a preferred embodiment of the invention is a bingo game which involves two or more players. In such a game, each player may play the bingo game on a different gaming machine 100.

In one embodiment, the gaming machines 100 may be game kiosks or interfaces and two or more of the gaming machines 100 are configured to permit different players to play the same game being offered via a central server 130 (such as the same bingo game). The central server 130 may generate game information which is provided to the gaming machines 100 which are in communication therewith. In the case of a bingo game, for example, the central server 130 may start bingo games, draw or select bingo balls/numbers, generate and/or distribute game cards, verify matches and winning outcomes and the like.

It will be appreciated that the gaming machine and system described and illustrated in FIG. 2 is only exemplary of an environment for a game of the invention. For example, it is possible to implement games via other types of gaming device, such as hand-held devices and computing devices such as home and laptop computers, such as via an on-line, web-based environment. It is also possible to implement the game in non-electronic environments. For example, relative to a bingo game, physical printed cards could be distributed to players.

When games or promotional events are presented via a gaming machine in a system environment, such as by the system illustrated in FIG. 2, one or more of the steps may be performed by the gaming machine and/or server. For example, a game server may be configured to generate game cards, randomly select balls or game numbers, track and display matches of game numbers to game cards, and confirm whether a player's eligibility for a promotional award. In such a configuration, steps of the game might be implemented via machine readable code which is stored at a memory of the gaming machine and executed by the controller of the gaming machine.

As indicated above, the promotional awards and events of the invention may be associated with table or other types of games. For example, a casino may offer promotional awards to players of table games. As one example, a casino might include one or more physical cards bearing property logos or symbols in one or more decks of playing cards. Those decks of cards may be used in the play of blackjack or poker games at gaming tables. A player who receives one of the playing cards bearing a property logo/symbol might win a property promotional award as described in greater detail.

It will be appreciated that gaming or promotional systems of multiple casinos or properties may be linked. For example, as indicted above, promotional awards for a second casino or property might be awarded at a first casino or property. The gaming/promotional systems for those two casinos/properties might be linked, such as for triggering such awards or tracking the redemption of such awards.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A method of utilizing a gaming machine at a first gaming location to entice a player of the gaming machine to travel to a second gaming location remote from the first gaming location, comprising:

accepting a wager from the player to play at least one wagering game on the gaming machine;

determining an outcome of the wagering game, wherein:

one or more combinations of possible outcomes are designated as winning outcomes having an associated game award, and awarding the player the promotional award at the gaming machine, the promotional award comprising free or reduced price goods, services, or amenities which are redeemable at the second gaming location and which are not redeemable at the first gaming location.

2. The method in accordance with claim 1 further comprising printing a ticket at the gaming machine designating the promotional award.

3. The method in accordance with claim 2 wherein the ticket is redeemable at the second gaming location and is not redeemable at the first gaming location.

4. The method of in accordance with claim 1 wherein the first gaming location is a first casino property and the second gaming location is a second casino property.

5. The method in accordance with claim 1 wherein said promotional award comprises free or reduced cost lodging at said second gaming location.

6. The method in accordance with claim 1, wherein the one or more combinations of possible outcomes include the display of an indicia comprising a logo, the logo identifying the second gaming location.

7. The method in accordance with claim 1, further comprising:

a feature game associated with said wagering game wherein said awarding said player comprises offering said player a chance to receive said property promotional award of free or reduced price goods, amenities or services which requires said player to travel to said second casino property for redemption.

8. The method in accordance with claim 7, wherein said promotional award varies with said outcome of said feature game.

9. The method in accordance with claim 4, wherein the gaming machine is connected to a first casino gaming system of the first casino property, the first casino gaming system being linked to a second casino gaming system of the second casino property that is independent from the first casino gaming system, and the promotional award information being received from the second casino gaming system.

10. The method in accordance with claim 1, wherein said promotional award is provided by a vendor.

11. A gaming machine at a first gaming location, the gaming machine configured to entice a player of the gaming machine to travel to a second gaming location remote from the first gaming location, comprising:

a video display configured to display an outcome of a wagering game played on the gaming machine by the player; and a processor configured to:

accept a wager from the player to play at least one wagering game on the gaming machine;

determine an outcome of the wagering game, wherein one or more combinations of possible outcomes are designated as winning outcomes having an associated game award, and award the player the promotional award at the gaming machine, the promotional award comprising free or reduced price goods, services, or amenities which are redeemable at the second gaming location and which are not redeemable at the first gaming location.

12. The gaming machine in accordance with claim 11, further comprising a printer configured to print a ticket at the gaming machine designating the promotional award.

13. The gaming machine in accordance with claim 12, wherein the ticket is redeemable at the second gaming location and is not redeemable at the first gaming location.

14. The gaming machine in accordance with claim 11, wherein the first gaming location is a first casino property and the second gaming location is a second casino property.

15. The gaming machine in accordance with claim 11, wherein said promotional award comprises free or reduced cost lodging at said second gaming location.

16. The gaming machine in accordance with claim 11, wherein the one or more combinations of possible outcomes include at least one game bearing a logo, the logo identifying the second gaming location.

17. The gaming machine in accordance with claim 11, wherein the processor is further configured to present a feature game associated with said wagering game, wherein said awarding said player comprises offering said player a chance to receive said property promotional award of free or reduced price goods, amenities or services which requires said player to travel to said second casino property for redemption.

18. The gaming machine in accordance with claim 14, wherein said promotional award varies with said outcome of said feature game.

19. The gaming machine in accordance with claim 17, wherein the gaming machine is configured to be connected to a first casino gaming system of the first casino property, the first casino gaming system being linked to a second casino gaming system of the second casino property that is independent from the first casino gaming system, and the promotional award information being received from the second casino gaming system.

* * * * *